Nov. 12, 1929.  J. C. BLACK  1,734,959
APPARATUS FOR CLARIFYING AND DECOLORIZING PETROLEUM OIL
Original Filed April 5, 1920
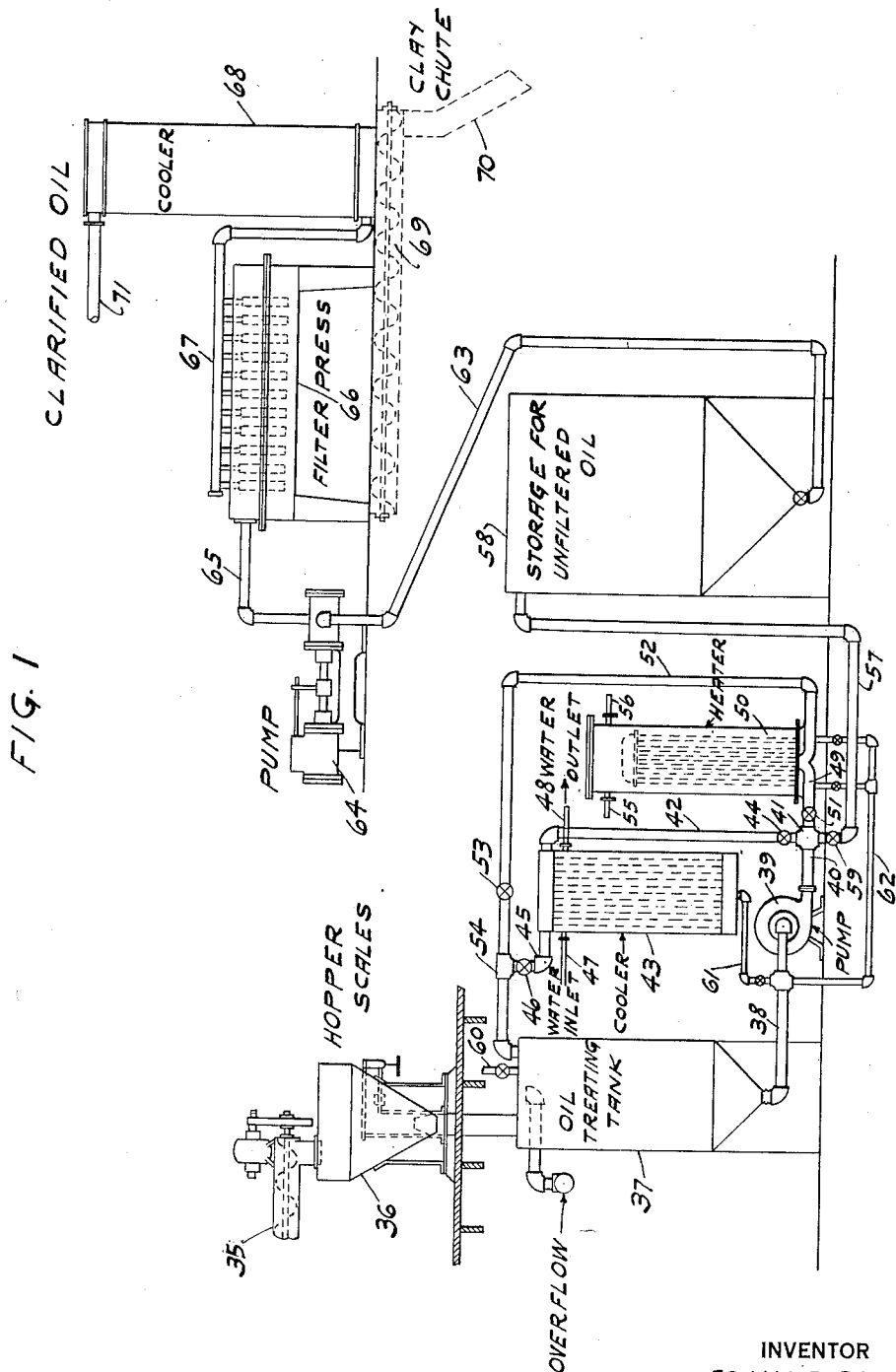
INVENTOR
JOHN C. BLACK.
BY
Marvin L. Chappell
ATTORNEY Patented Nov. 12, 1929

1,734,959

UNITED STATES PATENT OFFICE

JOHN C. BLACK, OF LOS ANGELES, CALIFORNIA, ASSIGNOR, BY MESNE ASSIGNMENTS, TO CONTACT FILTRATION COMPANY, OF SAN FRANCISCO, CALIFORNIA, A CORPORATION OF DELAWARE

APPARATUS FOR CLARIFYING AND DECOLORIZING PETROLEUM OIL

Original application filed April 5, 1920, Serial No. 371,399. Divided and this application filed August 2, 1927. Serial No. 210,155.

This invention relates to a new and useful apparatus for clarifying and decolorizing petroleum oil, and is a division of the pending application of John C. Black, process of refining oil, filed April 5, 1920, Serial Number 371,399.

At the present time there is a process extensively used for treating petroleum oils consisting in causing the oils to percolate through clay or fuller's earth. Fuller's earth has also been employed in the process of clarifying and decolorizing animal and vegetable oil by contact methods at temperatures of approximately 212 degrees F., but have not been employed by the contact method at much higher temperatures than 212.

My invention relates to an apparatus for the treatment of hydrocarbon oils with a clarifying and decolorizing agent by the process described in my co-pending application Serial No. 371,399, of which this is a divisional part.

The methods now in common use for clarifying and improving the color of petroleum oils employ a filter bed of clay or fuller's earth, through which the oil is allowed to percolate. My method comprises mixing with the oil finely divided clay, and then filtering the clay from the oil. By employing my method a great deal of oil and a given amount of clay is obtained and better results are secured with respect to the color and quality.

This invention will be best understood from the following description taken in connection with the accompanying drawing, illustrating diagrammatically means for carrying out the steps of the process in accordance with the apparatus of this invention. The drawing shows in a general way means which may be employed by this apparatus, but the invention is in no way limited to the means shown.

The figure shows an apparatus for treatment of the oil with the clay by means of which a highly refined oil is obtained.

To make a treatment of an oil with the finished clay, the dry clay is added to the oil and agitated by any suitable means, the time of agitation depending to a very great extent upon the temperature and viscosity of the oil. Apparently the higher the temperature, the more rapid the action up to certain limits. However, when too high a temperature is employed, vaporization of the oil may take place and also severe oxidation. This oxidation may be sufficient to destroy the improved color obtained at a lower temperature. The temperature employed will also vary with the grade of oil under treatment. As a rule, the heavier the oil the less the temperature at which it should be treated, the color degrading with increasing temperature. The heating of the oil under clay treatment apparently improves the quality of the oil by removing those bodies easily oxidized, and an oil so treated will maintain its color better than one treated cold or at a low temperature.

In the drawing, 35 represents generally a conveyor which transfers clay from the storage bin 34 to a hopper scale 36. From the hopper scale the clay is discharged into an oil treating tank 37. A pipe line 38 is connected to a pump 39. The other side of the pump is connected by a pipe 40 to a cross 41. One branch of the cross is connected by a pipe 42 to a cooler 43. A valve 44 controls the flow of liquid through pipe 42. The cooler has a discharge pipe 45 and a control valve 46. The usual intake and discharge pipe for cooling water are indicated by 47 and 48. Another branch of the cross 41 is connected by a pipe 49 to a heater 50. Pipe 49 is controlled by a valve 51. The discharge of the heater is connected by a pipe line 52 to the treating tank 37, there being a valve 53 for controlling the flow of liquid therethrough. Pipe 45 leading from the cooler is connected by a tee 54 to the pipe line 52. Suitable steam intake and discharge pipes indicated respectively by 55 and 56 are provided for the heater. Another branch of the cross 41 is connected by a pipe line 57 to a storage tank for filtering oil indicated by 58. A valve 59 controls the flow of liquid through pipe 57.

The oil and clay are treated in the following manner: valves 44, 46, and 59 are closed, thereby cutting out the cooler and line to the storage tank. Valves 51 and 53 are opened, thereby placing the heater in circuit with the oil treating tank and the pump. The oil to be treated is introduced into the tank 37 through a pipe 60. The oil is then circulated until the desired temperature is reached, say 200° Fahrenheit. The proper amount of clay as measured out on the hopper scale is then introduced to the oil treating tank. The amount has been previously determined by experiment on a small sample of oil and clay. The oil and clay in the system are now treated continuously by circulation and the temperature brought to the point best suited for that particular oil, say from 250° Fahrenheit to 325° Fahrenheit. This temperature is maintained for a short period to insure good treatment of the oil, and valves 51 and 53 closed to cut out the heater. Valves 44 and 46 are now opened, and the mixture of oil and clay circulated through the cooler. After the treated oil has been cooled sufficiently, the cooler 43 is cut out by closing valves 44 and 46, and valve 59 opened. The oil is now pumped from the oil treating tank to the unfiltered oil storage tank 58. A drain line 61 leads from the cooler 43 to the suction of the pump 39, and another drain line 62 leads from the heater to the suction of the pump.

The oil is next passed through a suitable filtering press or machine to separate the clay and the oil. The oil is then delivered from the machine to a cooler. The oil must be cool before it is stored, and during cooling should not be exposed to the atmosphere.

A pipe line 63 is connected to the intake of a pump 64 which delivers the mixture of oil and clay from the storage tank 58 and clay through discharge line 65 to a filter press 66. The oil passes from the filter press by a pipe line 67 to a cooler 68. The spent clay is delivered by a conveyor 69 to a chute 70. This completes the treatment of the oil. From the cooler the oil is delivered by a pipe line 71 to a finished oil storage tank.

What I claim is:

1. An apparatus for clarifying and improving the color of hydrocarbon oils, comprising an oil treating tank, means for introducing oil and a clarifying and decolorizing agent into the tank, means for commingling and heating the oil and agent, said means comprising a pump, a heater, and pipes connecting the tank, pump and heater whereby the oil and agent is circulated through the heater and back to the tank, means for cooling the oil and agent, said means comprising the aforesaid pump, a separate cooler, and pipes connecting the tank, pump and cooler whereby the oil is circulated under pump pressure through the cooler and back to the tank and means for separating the agent from the oil.

2. An apparatus for clarifying and improving the color of hydrocarbon oils, comprising an oil treating tank, means for introducing regulated quantities of oil and a clarifying and decolorizing agent into the tank, means for commingling and heating the oil and agent, said means comprising a pump, a heater, and pipes connecting the tank, pump and heater whereby the oil and agent is circulated through the heater and back to the tank, means for cooling the oil and agent, said means comprising the aforesaid pump, a separate cooler, and pipes connecting the tank, pump and cooler whereby the oil is circulated under pump pressure through the cooler and back to the tank, means for separating the agent from the oil and means for cooling the separated oil.

3. An apparatus for clarifying and improving the color of hydrocarbon oils, comprising an oil treating tank, means for introducing regulated quantities of oil and a clarifying and decolorizing agent into the tank, means for commingling and heating the oil and agent, said means comprising a pump, a heater, and pipes connecting the tank, pump and heater whereby the oil and agent is circulated through the heater and back to the tank, means for cooling the oil and agent, said means comprising the aforesaid pump, a separate cooler, and pipes connecting the tank, pump and cooler whereby the oil is circulated under pump pressure through the cooler and back to the tank, filter press means for separating the agent from the oil and means for cooling the separated oil.

4. An apparatus for clarifying and improving the color of hydrocarbon oils comprising a treating tank; means for introducing oil and a clarifying agent into said tank; a heater, a separate cooler; means for circulating oil and agent from said treating tank through said heater and said cooler and back into said treating tank, selectively; and means for discharging treated oil from the system.

5. An apparatus for clarfying and improving the color of hydrocarbon oils comprising a treating tank; means for introducing regulated quantities of oil and clarifying and decolorizing agent into said tank; a heater; a separate cooler; means for circulating oil and agent from said treating tank through said heater and said cooler selectively, and back into said treating tank; means for separating the agent from the oil and means for selectively discharging oil and agent from said treating tank into said separating means.

In testimony whereof I affix my signature.

JOHN C. BLACK.